United States Patent [19]

Fritz et al.

[11] Patent Number: 5,094,271

[45] Date of Patent: Mar. 10, 1992

[54] EXPANDABLE HOSE THAT REDUCES THE HAMMERING PRODUCED IN HYDRAULIC SYSTEM BY PUMPS

[75] Inventors: Thomas Fritz, Gernsbach; Franz Merkel, Weisenbach, both of Fed. Rep. of Germany

[73] Assignee: Aeroquip GmbH

[21] Appl. No.: 547,851

[22] Filed: Jul. 3, 1990

[30] Foreign Application Priority Data

Jul. 5, 1989 [DE] Fed. Rep. of Germany ...... 3922101

[51] Int. Cl.⁵ .............................................. F16L 55/04
[52] U.S. Cl. ........................................ 138/30; 138/26; 181/255
[58] Field of Search .................. 138/26, 30; 181/207, 181/255, 196, 234, 233; 417/540

[56] References Cited

U.S. PATENT DOCUMENTS

| 752,175 | 2/1904 | Monnier | 181/234 |
|---|---|---|---|
| 3,150,689 | 9/1964 | Lieberman | 138/30 |
| 3,215,164 | 11/1965 | Szczepanski | 138/26 |
| 3,323,305 | 6/1967 | Klees | 181/207 |
| 3,766,992 | 10/1973 | Tiraspolsky et al. | 138/30 |
| 3,908,788 | 9/1975 | Hammarstedt | 181/233 |
| 4,285,534 | 8/1981 | Katayama et al. | 138/26 |
| 4,611,633 | 9/1986 | Buchholz et al. | 138/26 |
| 4,762,150 | 8/1988 | Kokuryu | 181/196 |

FOREIGN PATENT DOCUMENTS

| 1078179 | 3/1974 | U.S.S.R. | 138/26 |
|---|---|---|---|
| 2224315 | 5/1990 | United Kingdom | 138/26 |

Primary Examiner—James E. Bryant, III

[57] ABSTRACT

An expandable hose that reduces the hammering produced in hydraulic systems by pumps. A tubular outer section of flexible material has a fitting at each end and loosely accommodates a tubular inner section of flexible material, leaving a hollow space between them. One end of the inner section communicates with one of the fittings, allowing fluid to flow through it, whereas the other end is free and open. A fluid-conveying channel is left between the free end of the inner section and the other fitting. There is a constriction between the inner section and the outer section that separates the tubular channel from the fluid-conveying channel. The wall of the inner section is solid in the vicinity of the tubular channel, so that fluid can enter the tubular channel from the fluid-conveying channel only by way of the constriction. The position of the constriction dictates the ratio of the capacity of the tubular channel to that of the fluid-conveying channel in terms of frequency.

11 Claims, 6 Drawing Sheets

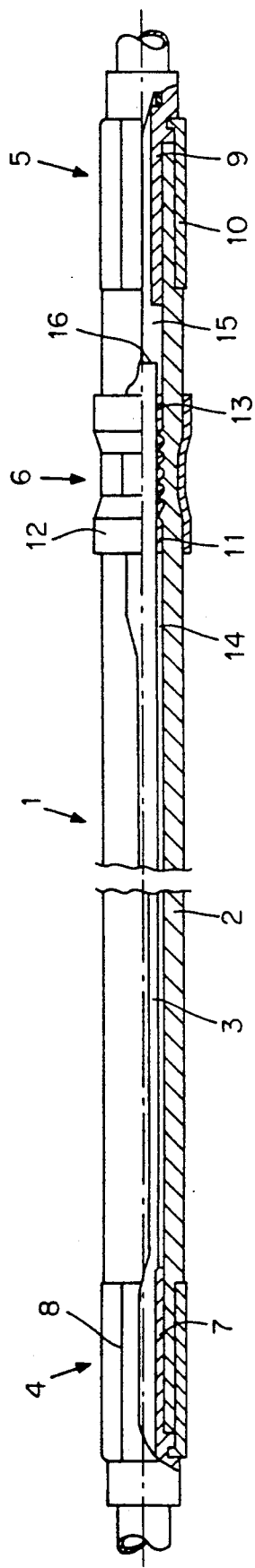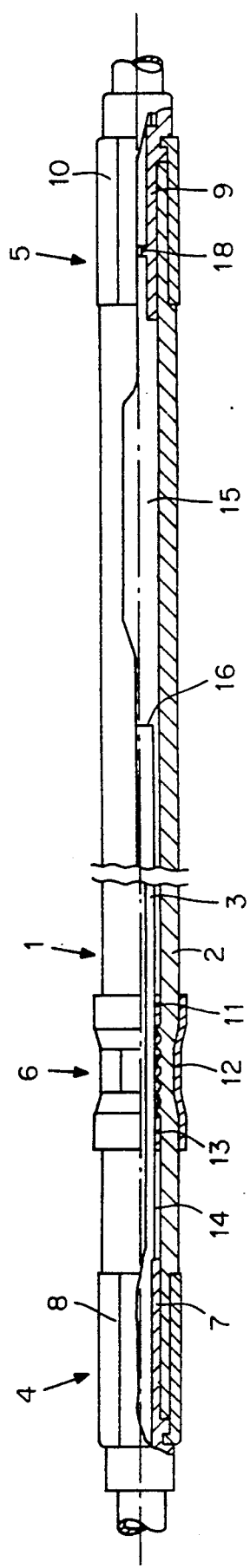

EXPANDABLE HOSE THAT REDUCES THE HAMMERING PRODUCED IN HYDRAULIC SYSTEM BY PUMPS

BACKGROUND OF THE INVENTION

The invention concerns expandable hose that reduces the hammering produced in hydraulic systems by pumps, with a tubular outer section of flexible material that has a fitting at each end and that loosely accommodates a tubular inner section of flexible material, leaving a hollow space between them, whereby one end of the inner section communicates with one of the fittings, allowing fluid to flow through it, whereas the other end is free and open, and whereby a fluid-conveying channel is left between the free end of the inner section and the other fitting. The use of expandable-hose sections of this type to decrease the noise of hammering in the power-steering systems of motor vehicles for example is known. The outer section is made from a material that is to some extent flexible. It can be constructed like a section provided with armor or reinforcement from a core, armor, and casing. When the pressure peaks characteristic of hammering occur, the outer section will expand accordingly to accommodate additional fluid and decelerate it. This action considerably reduces the hammering and the associated noise perceptible at the steering end.

An expandable hose of the aforesaid type is known from U.S. Pat. No. 3 323 305. The outer section has a fitting with a smooth inner surface all the way through it at the pump end and another at the steering end. Also communicating with the fitting at the pump end is a flexible inner section, the other end of which terminates free and open at a certain distance away from the fitting at the steering end of the outer section, leaving a fluid-conveying channel at that point. The free and open end of the inner section is surrounded by an open cap that decreases friction against the core deriving from motions on the part of the inner section inside the outer section. Since the inner section is, like the outer section, flexible, it can be employed in cramped situations in the vehicle. Since a tubular channel with the same dimensions and purpose as the channels at the ends surrounds the inner section, pressure waves will travel twice through the tubular channel and arrive phase-shifted in relation to other waves in the fluid-conveying channel, accomplishing both reduction and mutual cancellation. The tubular channel left around the total length of the inner section has an essentially solid wall and can accordingly be entered only from the fluid-conveying channel. There is no constriction between the fluid-conveying channel and the tubular channel. If the inner section has a radial perforation near where it is secured to the fitting at the pump end, fluid will be able to flow through the tubular channel from two ends on the principle of a bypass that pressure waves travel all the way through only once.

An expandable-hose section that reduces hammering is known from German OS 3 339 876. A flexible inner section is connected to the pump-end fitting in an outer section in this embodiment as well and extends essentially over the total length of the outer section, terminating in a free and open end somewhat upstream of the fitting at the other end. More or less at the midpoint of the length of the outer section there is a constriction between the inner and the outer section, creating two tubular channels in the hose. The inner section terminates free and open in this embodiment as well, and specifically in the second tubular channel. The inner section has constricting radial perforations for fluid to flow through only in the vicinity of the first tubular channel, and the fluid arrives in the second tubular channel through the constriction. This design is another example of a bypass, in that the fluid is provided with two different routes through the hose in order to decrease the noise deriving from the pressure waves in the second tubular channel by shifting their phases. The two tubular channels can also be considered fluid-conveying channels in that the fluid can flow through both.

U.S. Pat. No. 4 285 534 discloses an expandable hose with an outer section that has a constriction about halfway along its length. It has no inner section. The two fittings also have constrictions, creating a series of two fluid-conveying channels. Since there is a total of three constrictions in the series, a lot of pressure is undesirably lost.

SUMMARY OF THE INVENTION

The object of the present invention is to improve an expandable hose of the aforesaid type to the extent that hammer can be deliberately attenuated at a prescribed range of frequencies in various applications.

This object is attained in accordance with the invention by a constriction between the inner section and the outer section that separates the tubular channel from the fluid-conveying channel, in that, since the wall of the inner section is solid in the vicinity of the tubular channel, fluid can enter the tubular channel from the fluid-conveying channel only by way of the constriction, and in that the position of the constriction dictates the ratio of the capacity of the tubular channel to that of the fluid-conveying channel in terms of frequency. The present invention exploits the principle of a reservoir, which is embodied by the tubular channel and which fluid can enter only from the fluid-conveying channel, flowing both in and out by way of this single opening. The principle is accordingly not that of a bypass. There is a constriction at the only point of communication between the fluid-conveying channel and the tubular channel, and the position of the constriction along the total length of the outer and the inner section dictates the ratio of the capacity of the tubular channel to that of the fluid-conveying channel. This approach facilitates adapting the hose to various applications in that the desired hammer attenuation will occur at specific frequencies. It will be obvious that these frequencies will be different in different applications. The tubular channel will, due to the radial flexibility of the outer section, briefly accommodate peak fluid pressures and volumes and will release them phase-shifted to the fluid-conveying channel, where the amplitude ratio will be decreased. The tubular channel divides a fluid that exhibits no flow subject to static conditions. The outer section that surrounds the tubular channel can be considered a membrane that reacts to atmospheric pressure. The tubular channel acts in particular on the dynamic components of flow and represents an additional point of reflection. The wave that enters the tubular channel also depends on the impedance offered by the constriction. Due to the different reflections at the steering and pump ends and at the constriction, the attenuation will vary with respect to frequency in accordance with the ratio between the two capacities.

It is of particular advantage for the fitting that communicates with the fluid-conveying channel to have a diaphragm. The diaphragm will reflect sonic waves, decrease the impedance, and eliminate other waves in the event of a phase difference. The fitting that communicates with the fluid-conveying channel can be positioned either at the pump end or at the other end.

The fitting that faces away from the fluid-conveying channel can also have a diaphragm. Both fittings will accordingly have diaphragms. It is practical for the fitting at the pump end to be essentially identical in design with the fitting at the other end.

The inner section can communicate with the fitting at the pump end. Although this is the preferred embodiment, it is also possible for the inner section to communicate with the fitting at the steering end, so that, if the two fittings are identical in design, fluid can also flow through the hose in the opposite direction.

The inner section can be longer than the tubular channel and the end of the inner section that projects beyond the constriction can extend into the fluid-conveying channel. The main current flowing through the hose will accordingly be supplied to the middle of the fluid-conveying channel and will be able to enter the tubular channel only from that point. This design makes it immediately possible to position the constriction at various point along the same inner tube depending on the application.

It is also possible to accommodate another inner section that communicates with the facing fitting in the fluid-conveying channel. It will be obvious that the first inner section communicates with the first fitting and the second inner section with the other fitting. The second inner section can be positioned either at the steering end or at the pump end.

The second inner section can also have a constriction that fluid must travel through to arrive in another and similar tubular channel. The hose will accordingly have two tubular channels and one fluid-conveying channel, whereby the tubular channel can be entered only from the fluid-conveying channel. It is practical for the capacities of the two tubular channels to differ. This approach will allow a comparatively wide range of attenuation.

The end of the inner section that extends into the fluid-conveying channel can have radial perforations that, in conjunction with the free and open end of the inner section, create various outlets for pressure waves to enter the fluid-conveying channel through and propagate hence. This design simultaneously diffuses the radiation of the sound waves from the end of the inner tube into the fluid-conveying channel, augmenting the attenuation. If there are two inner tubes, the end of the second inner section that extends into the fluid-conveying channel can also have radial perforations.

BRIEF DESCRIPTION OF THE DRAWINGS

Preferred embodiments of the invention will now be described by way of example with reference to the drawings, wherein FIG. 5 illustrates another embodiment of an expandable hose, FIG. 6 illustrates a third embodiment of an expandable hose.

DESCRIPTION OF THE PREFERRED EMBODIMENTS

Figure 1:
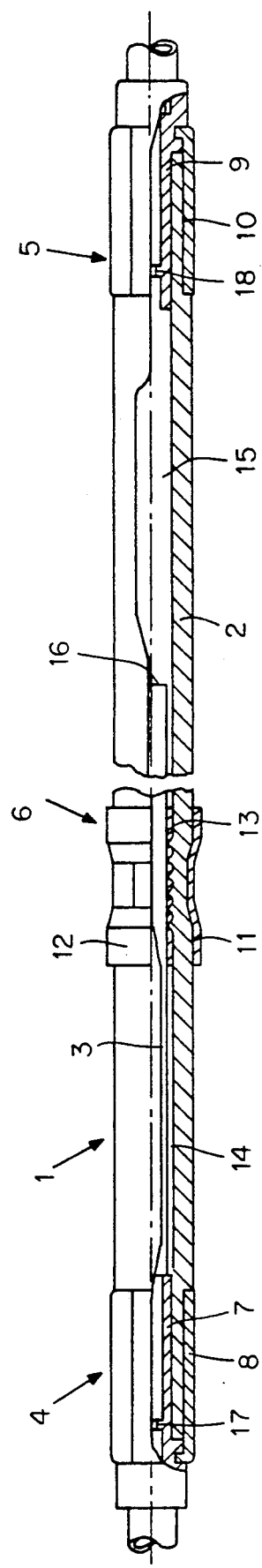
FIG. 1 is a partly sectional illustration of one embodiment of an expandable hose.
Figure 2:
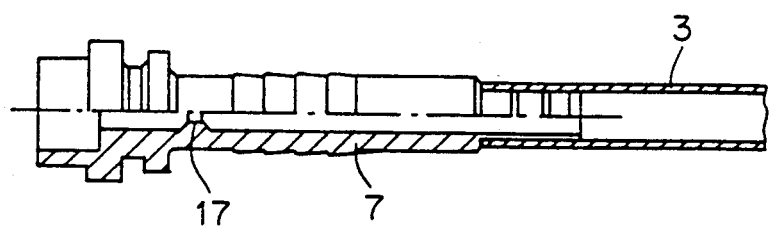
FIG. 2 illustrates the pump-end fitting on the hose illustrated in FIG. 1.
Figure 3:
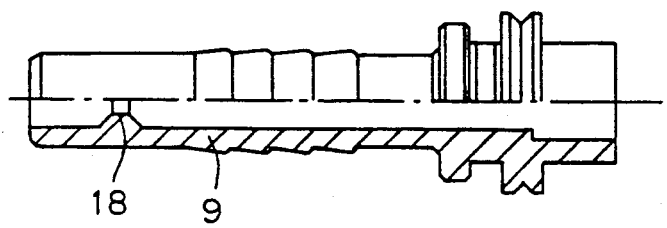
FIG. 3 illustrates the fitting at the other end of the outer section illustrated in FIG. 1.
Figure 4:
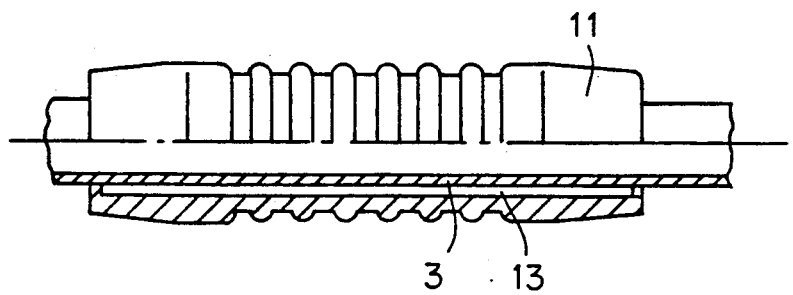
FIG. 4 illustrates the nipple of a constriction associated with the hose illustrated in FIG. 1.

The expandable hose 1 illustrated in FIG. 1 has an outer section 2, an inner section 3, two fittings 4 and 5, and a constriction 6. Outer section 2 is made from flexible material and can comprise the conventional core, reinforcement, and casing. The structure is not specifically illustrated. There may be several fabric-reinforcing inserts. Outer section 2 is also flexible and can be installed curved in the vehicle depending on the available space. It possesses limited radial elasticity and resilience. Inner section 3 is also a flexible tube with a solid wall. It can be a plastic tube, a tube of polytetrafluoroethane for example. Inner section 3 is shorter than outer section 2 and is fastened at one end to fitting 4 (FIG. 2). Since fitting 4 has a nipple 7 and a bushing 8, it constitutes a crimping fitting. It will be evident that both inner section 3 and outer section 2 are secured to fitting 4. The fitting 5 at the pump end is in itself similar in design and has a nipple 9 and a bushing 10. Since inner section 3 is not secured to the fitting at the other end, nipple 9 differs slightly from nipple 7 (FIGS. 2 and 3). Constriction 6 also has a nipple 11 and a bushing 12 (FIGS. 1 and 4). Constriction 6 is positioned at the desired point along outer section 2 in relation to inner section 3 and crimped secure by bushing 12. Between the outside diameter of inner section 3 and the inside diameter of nipple 11 is a constricting gap 13. The resulting structure creates a tubular channel 14 between inner section 3 and outer section 2 and between fitting 4 and constriction 6 and a fluid-conveying channel 15 in the other component of outer section 2 between constriction 6 and fitting 5. The wall of tubular channel 14 is essentially solid, and fluid can enter from fluid-conveying channel 15 only by way of constricting gap 13. As will be evident from FIG. 1, constriction 6 is not precisely at the end of inner section 3 but is more or less remote from the free end 16 of inner section 3. Since free end 16 is open, meaning that it is not closed off by a cap or constrictive structure, fluid will flow through fitting 4 and inner section 3 into fluid-conveying channel 15 and hence through fitting 5 toward the vehicle's steering system. When peak pressure and sonic waves occur, they will also propagate out through constricting gap 13 into tubular channel 14, where they will be reflected phase-shifted back out of the tubular channel and into fluid-conveying channel 15, considerably contributing to the desired shift in amplitude and hence to the reduction of noise. It will be evident that constriction 6 can be moved to and secured at various points along inner section 3, varying the ratio of the capacity of tubular channel 14 to that of fluid-conveying channel 15. This is, however, not the only factor that regulates the attenuation of hammering. It operates in conjunction with a special fitting design. Nipple 7 (FIG. 2) has for this purpose a diaphragm 17 and the nipple 9 in fitting 5 a diaphragm 18. Diaphragms 17 and 18 constitute bottlenecks that not only help to locally accelerate the fluid but also and in particular reflect sonic waves, augmenting the attenuation. It is not absolutely necessary in every case for a hose 1 to have both diaphragms 17 and 18. What is primarily important is a diaphragm 18 on fitting 5 adjacent to fluid-conveying channel 15. There are two possible embodiments. Fitting 5 can be positioned either at the pump end or at the steering end. FIG. 1 illustrates the version with the fitting 5 at the steering end.

FIG. 5 illustrates a hose 1 that is in principle precisely like the embodiment illustrated in FIG. 1 except that inner section 3 is longer and extends almost as far as fitting 5. The capacity of tubular channel 14 is accordingly considerably reduced in comparison, whereas the position of constriction 6 simultaneously increases the capacity of tubular channel 14. It will be evident that hose 1 can also be connected up with the fluid flowing in the opposite direction, in which case fitting 5 will represent the pump-end connection and fitting 4 will be associated with the vehicle's steering mechanisms.

Since the hose 1 illustrated in FIG. 6 has its constriction 6 relatively near fitting 4, the capacity of tubular channel 14 will be relatively smaller than that of fluid-conveying channel 15. Since inner section 3 is accordingly comparatively long, therefore, its free end 16 will extend relatively far into fluid-conveying channel 15.

Figure 7:
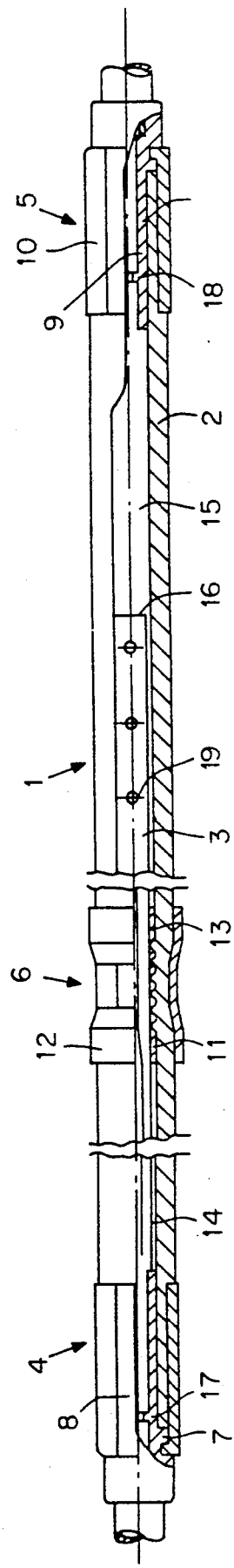
FIG. 7 illustrates a fourth embodiment of an expandable hose.

The embodiment illustrated in FIG. 7 is identical in principle with those previously described herein. Each fitting 4 and 5 has a diaphragm 17 and 18. The end of inner section 3 project beyond constriction 6 and extends into fluid-conveying channel 15. Since there are preferably several radial perforations 19 at this point, the fluid will flow into fluid-conveying channel 15 not only through the free end 16 of inner section 3 but also through perforations 19. Sonic waves will accordingly radiate diffusely through fluid-conveying channel 15. The reverse design is also conceivable in this embodiment.

Figure 8:
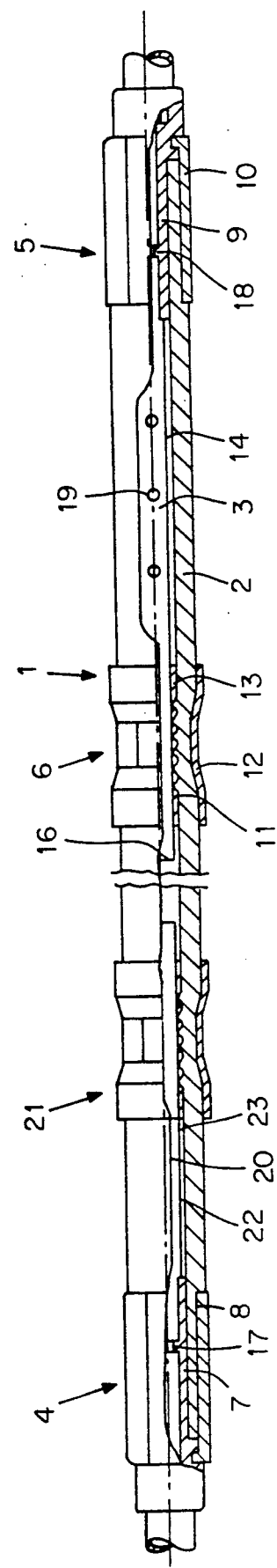
FIG. 8 illustrates a fifth embodiment of an expandable hose.

The embodiment illustrated in FIG. 8 has a tubular channel 14 facing the fitting 5 at the steering end. Another inner section 20 is crimped to fitting 4. Also associated with second inner section 20 is another constriction 21 that is identical in design with constriction 6. This approach creates another tubular channel 22 that, like first tubular channel 14, fluid can enter only by way of the joint fluid-conveying channel 15. It will be self-evident that second constriction 21 also has a constricting gap 23.

Figure 9:
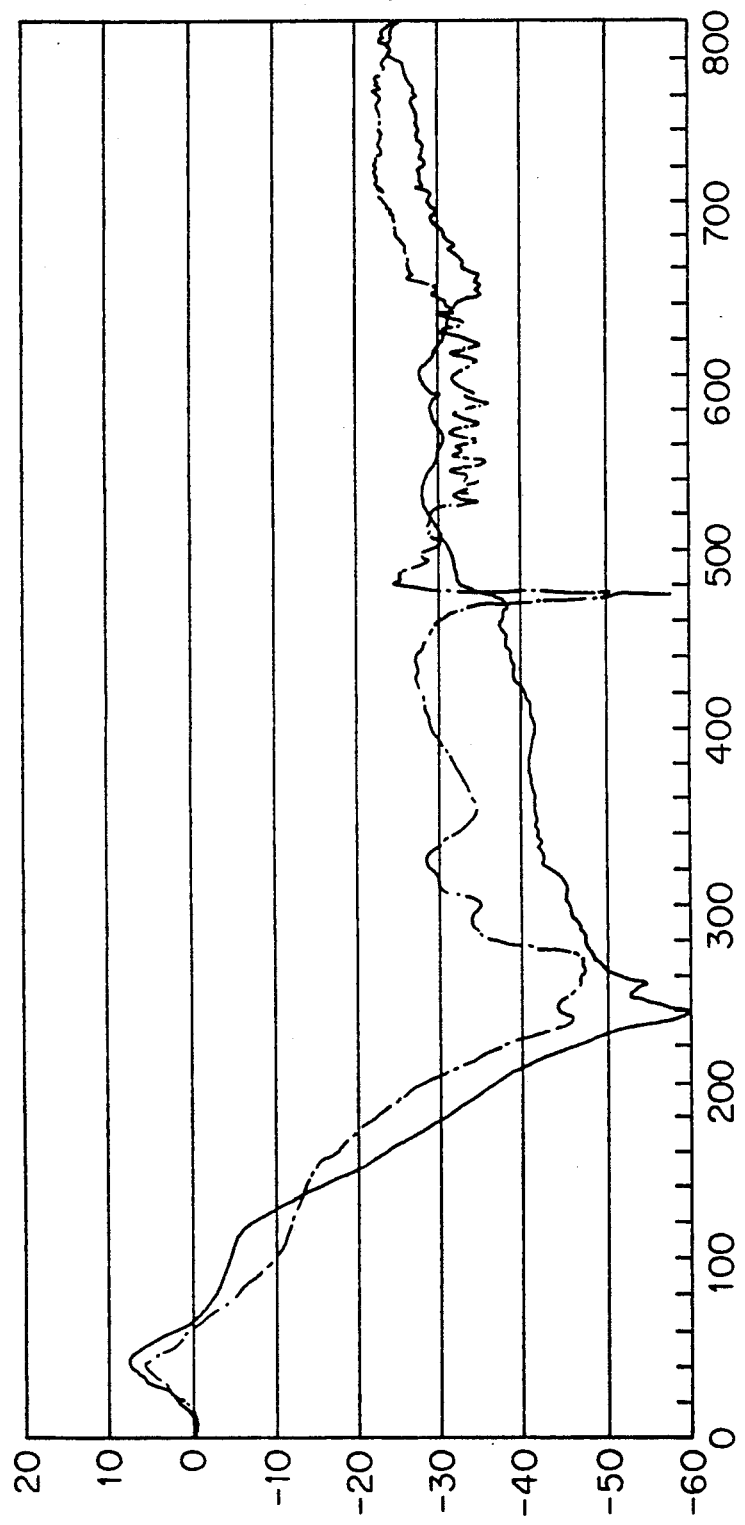
FIG. 9 is a graph illustrating the attenuation obtained with the expandable hoses illustrated in FIGS. 1 and 5 as a function of frequency.

FIG. 9 is a graph of attenuation as a function of frequency. The continuous curve represents the parameters associated with the embodiment illustrated in FIGS. 1 through 4. The dotted line represents those associated with the embodiment illustrated in FIG. 5. It will be evident that varying the position of constriction 6 and accordingly the ratio of the capacity of tubular channel 14 to that of fluid-conveying channel 15 will vary the attenuation in relation to frequency. Whereas the maximal attenuation of the embodiment illustrated in FIG. 1 is more or less in the 240 Hz range, the very narrow-band maximum for the embodiment illustrated in FIG. 5 is more or less at a frequency of 470 Hz.

Figure 10:
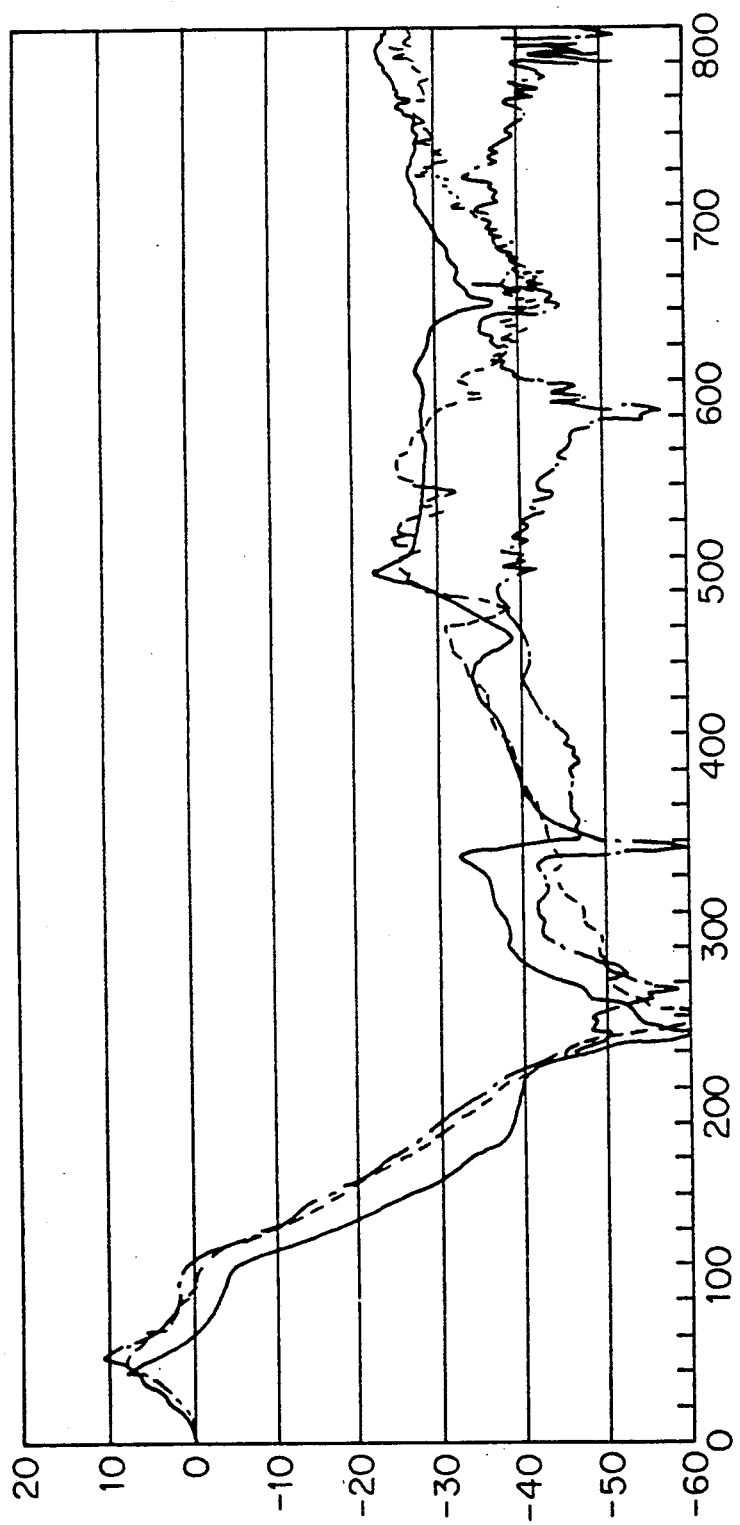
FIG. 10 is a graph illustrating the attenuation obtained with the expandable hoses illustrated in FIGS. 6, 7, and 8 as a function of frequency.

FIG. 10 is another graph. The continuous curve represents the embodiment illustrated in FIG. 6, the dotted line the embodiment illustrated in FIG. 7, and the dashed line the embodiment illustrated in FIG. 8. The different locations and distributions of the maximal attenuations attainable at various frequencies in accordance with the particular geometry and adjustment will be evident.

We claim:

1. An expandable hose for reducing hammering effects produced by pumps in hydraulic systems, comprising: a tubular outer section of flexible material; first and second fittings at each end of said tubular outer section; a tubular inner section of flexible material located within said outer section and spaced from said outer section by a hollow gap between said inner section and said outer section; said inner section having one end attached to said first fitting at one end of said outer section for passage of fluid through said inner section; the other end of said inner section being free and open; a fluid conveying channel connected between a free and open end of said inner section and said second fitting at the other end of said outer section; constriction means movably secured to said hose to constrict fluid coming from said fluid conveying channel to said tubular channel and vary the ratio of the capacity of the tubular channel between said inner section and said outer section, said hollow gap comprising a tubular channel, said constriction means separating said tubular channel from said fluid-conveying channel; said inner section having a substantially solid wall adjacent said tubular channel so that fluid can enter said tubular channel from said fluid-conveying channel only through said constriction means, a ratio of fluid volume capacity of said tubular channel to fluid volume capacity of said fluid-conveying channel being dependent on position of said constriction means and thereby dependent on frequency of pressure pulses to be reduced in said hydraulic systems, said constriction means being activated only by pressure pulsations, said tubular channel and said fluid-conveying channel having different volumes separated by said constriction means, fluid flowing through said constriction means coming only from said fluid-conveying channel and returning always to said fluid-conveying channel after reduction of peaks of pressure pulsations.

2. An expandable hose as defined in claim 1, including a diaphragm in said second fitting communicating with said fluid-conveying channel.

3. An expandable hose as defined in claim 1, including a diaphragm in said first fitting facing away from said fluid conveying channel.

4. An expandable hose as defined in claim 2, wherein said inner section communicates with said first fitting at a pump end.

5. An expandable hose as defined in claim 2, wherein said inner section communicates with said second fitting.

6. An expandable hose as defined in claim 4, wherein said inner section is longer than said tubular channel, said inner section having an end projecting beyond said constriction means and extending into said fluid-conveying channel.

7. An expandable hose as defined in claim 1, including an additional inner section communicating with said second fitting in said fluid-conveying channel.

8. An expandable hose as defined in claim 7, including an additional tubular channel; and an additional said constriction means in said additional inner section so that fluid flowing to said additional tubular channel must travel through said additional constriction means.

9. An expandable hose as defined in claim 6, wherein said inner section has an end with radial perforations extending into said fluid-conveying channel.

10. An expandable hose as defined in claim 8, wherein said additional inner section has an end with radial perforations extending into said fluid-conveying channel.

11. An expandable hose for reducing hammering effects produced by pumps in hydraulic systems, comprising: a tubular outer section of flexible material; first and second fittings at each end of said tubular outer section; a tubular inner section of flexible material located within said outer section and spaced from said outer section by a hollow gap between said inner section and said outer section; said inner section having one end attached to said first said fitting at one end of said outer section for passage of fluid through said inner section; the other end of said inner section being free and open; a fluid conveying channel connected between a free and open end of said inner section and said second fitting at the other end of said outer section; constriction means movably secured to said hose to constrict fluid coming from said fluid conveying channel to said tubular channel and vary the ratio of the capacity of the tubular channel between said inner section and said outer section said hollow gap comprising a tubular channel, said construction means separating said tubular channel from said fluid-conveying channel; said inner section having a substantially solid wall adjacent said tubular channel so that fluid can enter said tubular channel from said fluid-conveying channel only through said constriction means, a ratio of fluid volume capacity of said tubular channel to fluid volume capacity of said fluid-conveying channel being dependent on position of said constriction means and thereby dependent on frequency of pressure pulses to be reduced in said hydraulic systems, said constriction means being activated only by pressure pulsations, said tubular channel and said fluid-conveying channel having different volumes separated by said constriction means, fluid flowing through said constriction means coming only from said fluid-conveying channel and returning always to said fluid-conveying channel after reduction of peaks of pressure pulsations; a diaphragm in said second fitting communicating with said fluid-conveying channel; a diaphragm in said first fitting facing away from said fluid-conveying channel; said inner section communicating with said first fitting at a pump end; said inner section being longer than said tubular channel, said inner section having an end projecting beyond said constriction means and extending into said fluid-conveying channel; an additional inner section communicating with said second fitting in said fluid-conveying channel; an additional constriction means in said additional inner section; an additional tubular channel, fluid flowing to said additional tubular channel must flow through said additional constriction means; said end of one of said first mentioned said inner section extending into said fluid-conveying channel having radial perforations; said additional inner section having an end with radial perforations extending into said fluid-conveying channel.

* * * * *